United States Patent Office 3,211,714
Patented Oct. 12, 1965

3,211,714
POLYMERIZATION OF ACETYLENIC
COMPOUNDS
Joseph K. Hoffman, Morristown, N.J., assignor to Air Reduction Company, Incorporated, New York, N.Y., a corporation of New York
No Drawing. Filed Nov. 25, 1960, Ser. No. 71,451
6 Claims. (Cl. 260—94.1)

This invention relates to the polymerization of acetylenic compounds. More specifically, this invention relates to a catalytic method of polymerizing acetylenic compounds to form a product which is light in color and is soluble in organic solvents.

Several methods and various catalysts have been proposed for polymerizing acetylene and acetylenic compounds. However, the product produced by the prior art has been essentially a dark colored insoluble material. Copper-bearing catalysts such as cuprous oxide may be employed to polymerize acetylene with the product produced being a polyacetylene having a dark brown to black color and being insoluble in all known solvents, these polymers are known as cuprene or carbene.

It is an object of the present invention to provide a method for polymerizing an acetylenic compound to prepare a polymerized product which is light in color and which is soluble in organic solvents.

According to the present invention an acetylenic compound may be polymerized in the presence of a catalyst which is composed of an iron halide, an alkali metal acetylide, and a ketone. The polymerization is conducted in a solvent medium.

The polymerized acetylenic compounds prepared by the method of the present invention are light in color and are soluble in many organic solvents. The polymerized compounds may be blended with elastomers such as polybutadiene and the blends molded to give solid products possessing good physical, machining, chemical, and electrical properties. The heat cured blended products are extremely resistant to solvents. The polymer blends may be formed by milling the components thereof in mechanical kneading, or sheeting operations of the type commonly used in blending rubber and other plastics and the blended product or stock may be cut into any suitable shape such as strips, ribbons, or shreds to facilitate their use, as in molding.

The polymer blends of polybutadiene-containing elastomers may be prepared in various proportions by weight such as from 25 percent to 75 percent polyacetylene. The polymer blends may be molded in ordinary molds or injection molded under pressure and at elevated temperatures, preferably below 300° C.

The acetylenic compounds which may be polymerized according to the method of the present invention have the formula:

CH≡CR wherein R may be hydrogen, alkyl, cycloalkyl, alkenyl, or aryl radical. Examples of some of the compounds which may be polymerized are acetylene, isopropenyl acetylene, and phenyl acetylene.

In practicing the present invention the polymerization should be conducted in a solvent medium. The solubility of the final polymerized acetylene compound is at least partially dependent upon the nature of the solvent medium in which the polymerization is conducted. N,N'-dimethyl formamide has been found to be the preferred solvent medium since when the polymerization is conducted in this solvent, a greater proportion of the polymer prepared is soluble in organic solvents. Solvents such as dimethyl sulfoxide and tetrahydrofuran have been found to facilitate the preparation of a soluble polyacetylene; however, the product produced in these solvents appears to be a little less soluble than those prepared under the same conditions in dimethyl formamide. Dimethyl formamide may also be used as a mixture with dimethyl sulfoxide, tetrahydrofuran, dioxane, and acetonitrile. Where a mixture of solvents is to be employed, it is advantageous that at least one-third of the mixture be dimethyl formamide. The solvents employed in the examples given below were commercial products which were redistilled prior to their use. The quantity of solvent which is employed in practicing the present invention is not critical. It is merely necessary to provide sufficient solvent to ensure that the acetylenic compound is in solution. Obviously, where large quantities of solvent are employed the ease of handling is diminished.

The iron halide which is employed as a portion of the catalyst may be in either the ferric or ferrous form and it is preferred to use either the chloride or the bromide. It is necessary in practicing the present invention that the iron halides be anhydrous.

The alkali metal acetylide may be either sodium acetylide or potassium acetylide.

In forming the catalysts of the present invention any ketone may be employed; however, it is preferred to use a ketone having from 4 to 13 carbon atoms and having a higher boiling point than acetone since where acetone is employed, the temperature of the reactor must be controlled at a low level or the catalyst will become inactive due to the removal of the acetone from the catalyst as the temperature reaches the boiling point of the acetone. Thus, although acetone may be employed, since the temperature must be controlled at a fairly low level, the rate of the reaction is decreased. Examples of some of the preferred ketones are 2,5-hexanedione (actonyl acetone), 2,4-pentanedione (acetylacetone), acetophenone, cyclohexanone, benzophenone, and methyl ethyl ketone.

The preferred catalyst of the present invention contains approximately equal mols of iron halide and ketone and about 2 to 8 mols of alkali metal acetylide for each mol of iron halide. Thus, a preferred molar ratio of iron halide, ketone, and alkali metal acetylide is 1:1:6.

In a preferred method for conducting the polymerization of acetylene according to the present invention a solvent is added to a reactor which is equipped with an agitating means. Nitrogen is passed through the reactor. While agitating the reactor the ketone is added to the reactor. Using a powder funnel the alkali metal acetylide is added to the reactor followed by the anhydrous iron halide. The funnel is then washed with solvent to wash any of the solids remaining in the funnel into the reactor. The nitrogen is discontinued and acetylene is then added. The polymerization reaction is self-sustaining, that is, no heat is required initially. The temperature in the reactor should be controlled below about 80° C. because where the temperature is allowed to rise above about 80° C. the product produced is an insoluble product. Thus, in order to control the temperature below about 80° C. some cooling of the reactor may be necessary. As the catalyst becomes exhausted, the temperature in the reactor will gradually fall; however, the life of the catalyst may be extended by supplying heat to the reactor. It has been found that the catalyst is essentially inactive at a temperature below about 20° C., therefore, the temperature should be maintained above this point. It has been found that a preferred temperature range is between 40 and 60° C.

When the polymerization is complete, a solvent containing a stabilizer such as hydroquinone is added and the reaction mixture is cooled to room temperature. The catalyst is removed from the reaction mixture by any convenient means such as by centrifuging. The polymer is precipitated by pouring the reaction mixture into methanol (preferably containing a stabilizer such as hydroquinone). The precipitated polymer is then removed such as by centrifuging and washed with additional quantities of methanol. The polymer should be stored under methanol containing a stabilizer and refrigeration should be employed in order to prohibit cross-linking and formation of an insoluble product.

The polyacetylene prepared by the above method is characterized as being soluble in solvents such as N,N'-dimethyl formamide, dioxane, benzene, toluene, chloroform, carbon tetrachloride, and tetrahydrofuran. The polyacetylene is slightly soluble in ether, ethyl acetate, acetone, acetonitrile, and acrylonitrile, and is insoluble in hexane, acetic acid, methanol, ethanol, and water. From ultraviolet and infrared examination it was determined that the polyacetylene is non-benzenoid and possesses a linear structure. Bromination of the polyacetylene indicates a high degree of unsaturation, that is, one double bond per 78 grams of polymer or one double bond for every three acetylene carbon skeletons. Due to the unsaturation, the polyacetylene has a tendency to cross-link and become insoluble and intractable. The unsaturated polyacetylene was hydrogenated both by means of a Raney-nickel catalyst and palladium under charcoal catalyst; however, the products obtained were insoluble and darker in color than the original polyacetylene.

An intrinsic viscosity measurement of the soluble polyacetylene prepared according to the present invention gave a value of 0.07, in benzene, thus indicating a molecular weight of less than 1,000.

In the following examples wherein acetylene was polymerized, the method employed for the addition of the acetylene was as follows. Line acetylene was passed through a regulator and into Dry Ice traps which removed any acetone present in the acetylene. From the Dry Ice traps the acetylene passed into a water bubbler and into a wet test meter which measured the quantity of acetylene. From the wet test meter the acetylene passed through Dry Ice traps which removed water, into a series of drying towers containing activated alumina, calcium sulfate, and molecular sieves and hence into the polymerization reactor. The polymerization reactor consisted of a three-neck flask equipped with a stirrer, thermometer, and condenser. From the polymerization reactor the acetylene passed through a Dry Ice trap, a water bubbler and through a second water test meter. By employing the two wet test meters, one located ahead of and the other after the polymerization reactor, the quantity of acetylene which remained in the reactor could be determined.

The following examples are illustrative of the present invention. In the examples the iron halide was dried for 16 hours at 140° C. in a vacuum oven at 3 millimeters in order to insure that it is anhydrous.

*Example 1*

The reactor was flushed with dry nitrogen for about 30 minutes, and 130 milliliters of N,N'-dimethyl formamide were added to the reactor. While stirring 1.28 grams (0.0113 mol) of 2,5-hexanedione (acetonyl acetone) were added to the reactor. Using a powder funnel 4.08 grams (0.069 mol) of sodium actylide and 1.44 grams (0.0113 mol) of anhydrous ferrous chloride were added. The powder funnel was washed with approximately 20 milliliters of dimethyl formamide and the reactor was allowed to stir under nitrogen for approximately 10 minutes. The nitrogen was discontinued and acetylene was then passed into the reactor at a rate of approximately 30 liters per hour. The reaction temperature increased to 52° C. and cooling was employed to keep the temperature at about 50° C. After about 2 hours the addition of acetylene was discontinued. Five milliliters of dimethyl formamide containing 0.2 percent of hydroquinone were added to the reaction mixture and the reaction mixture cooled to room temperature. The mixture was then centrifuged at about 1800 r.p.m. for 30 minutes to remove the catalyst and the liquid was poured into 450 milliliters of methanol (containing 8 grams of hydroquinone per liter) to precipitate the polymer. The precipitated polymer was washed with methanol. Approximately 30 liters of acetylene were polymerized. The product produced was found to be soluble in N,N'-dimethyl formamide, dioxane, benzene, toluene, chloroform, carbontetrachloride and tetrahydrofuran. The intrinsic viscosity in benzene of the product polyacetylene was 0.07. The product was light tan in color.

*Example 2*

Acetylene was polymerized by the same method as described in Example 1 except that 1.13 grams (0.0113 mol) of 2,4-pentanedione were used in place of 2,5-hexanedione as the catalyst. The polymer produced was treated in the same manner as that of Example 1. The reaction time was approximately 3 hours and about 25 liters of acetylene were polymerized. The product possessed the same properties as that of Example 1.

*Example 3*

Acetylene was polymerized by the same method as described in Example 1 except that 1.36 grams (0.0113 mol) of acetophenone were employed as the catalyst. The product prepared possessed the same properties as that of Example 1. The reaction time was approximately 2 hours and about 26 liters of acetylene were polymerized.

*Example 4*

Acetylene was polymerized employing the same method as Example 1 except that 0.82 gram (0.0113 mol) of methyl ethyl ketone was employed as the catalyst. The product prepared possessed the same properties as Example 1. The reaction continued for approximately 2½ hours and about 25 liters of acetylene were polymerized.

*Example 5*

Acetylene was polymerized by the same method as that given in Example 1 except that 1.12 grams (0.0113 mol) of cyclohexanone were employed as the catalyst. The polyacetylene produced was a little darker in color than that of Example 1 but possessed the same properties. The reaction proceeded for approximately 1½ hours with about 30 liters of acetylene being polymerized.

*Example 6*

Acetylene was polymerized employing the same method as that given in Example 1 except that 0.66 gram (0.0113 mol) of acetone was employed as the ketone. The product prepared had about the same color and properties as that of Example 5. The reaction proceeded for approximately 2½ hours and about 30 liters of acetylene were polymerized.

*Example 7*

Acetylene was polymerized by the same method as that given in Example 1 except that 0.08 gram of benzophenone was employed as the ketone. The product prepared possessed the same properties as that of Example 1. The reaction proceeded for approximately 1½ hours with about 25 liters of acetylene being polymerized.

*Example 8*

Isopropenyl acetylene was polymerized by the following method. A three-necked reaction flask equipped with a stirrer, thermometer, and dispersion tube was flushed with nitrogen for 30 minutes. 150 milliliters of dimethyl formamide were added to the reactor. With the stirrer on 1.28 grams (0.0113 mol) of 2,5-hexanedione were added to the reactor. Using a powder funnel 3.7 grams (0.069 mol) of sodium acetylide and 1.44 grams (0.113 mol) of ferrous chloride were added. 60 milliliters of isopropenyl acetylene were placed in a gas dispersion bottle and the bottle was connected to the dispersion tube of the reactor. A flow of nitrogen was allowed to pass through the gas dispersion bottle and hence into the reactor carrying with it the isopropenyl acetylene. Nitrogen carrying the isopropenyl acetylene continued to flow into the reactor for approximately 1½ hours with approximately 57 milliliters of isopropenyl acetylene being carried into the reactor. The temperature of the reactor was controlled by external cooling of the reactor to about 50° C. The reaction mixture was cooled and centrifuged in order to remove the catalyst and the supernatant was poured into 450 grams of methanol (containing 8 grams of hydroquinone per gallon) to precipitate the polymer and a yellow colored polymer was obtained. The methanol-polymer mixture was centrifuged and the precipitated polymer washed with methanol. The washed polymer was allowed to stand under the methanol (hydroquinone) liquid. The polymer was dried in a vacuum oven at 45 to 50° C. and 200 milliliters for 4 hours and the dried material was found to be soluble in benzene and dioxane. The product was lighter in color than the product of Examples 1 through 7 and the product of Example 8 after it dried and exposed to air did not become insoluble as readily as the polyacetylene compounds of Examples 1 through 7.

I claim:

1. A light-colored linear homopolymer of acetylene of the formula $HC{\equiv}CH$ which has a molecular weight of less than 1000 and is soluble in benzene, said homopolymer being prepared by the process of claim 2.

2. A process for homopolymerizing an acetylenic compound of the formula $CH{\equiv}CR$, wherein R is selected from the group consisting of hydrogen, alkyl, cycloalkyl, alkenyl, and aryl, which comprises contacting said acetylenic compound with a catalyst consisting of (i) an iron halide selected from the group consisting of an iron chloride and an iron bromide, (ii) an alkali metal acetylide and (iii) a ketone containing 4 to 13 carbon atoms and being free from aliphatic unsaturation, said catalyst containing approximately equimolar proportions of iron halide and ketone and containing from 2 to 8 mols of alkali metal acetylide per mol of iron halide, in the presence of an organic solvent at a temperature of from 20 to 80° C.

3. A process for homopolymerizing acetylene comprising passing the acetylene into a reaction zone, said reaction zone containing a catalyst consisting of (i) an iron halide selected from the group consisting of an iron chloride and an iron bromide, (ii) an alkali metal acetylide and (iii) a ketone containing 4 to 13 carbon atoms and being free from aliphatic unsaturation, said catalyst containing approximately equimolar proportions of iron halide and ketone and containing from 2 to 8 mols of alkali metal acetylide per mol of iron halide, and a solvent selected from the group consisting of N,N′-dimethyl formamide, dimethyl sulfoxide, tetrahydrofuran, and mixtures thereof, at a temperature of from 20° to 80° C.

4. A process for homopolymerizing an acetylenic compound of the formula $CH{\equiv}CR$, wherein R is selected from the group consisting of hydrogen, alkyl, cycloalkyl, alkenyl, and aryl, comprising forming a solution of said acetylenic compound and a solvent selected from the group consisting of N,N′-dimethyl formamide, dimethyl sulfoxide, tetrahydrofuran, and mixtures thereof, and passing said solution through a reaction zone containing a catalyst consisting of (i) an iron halide selected from the group consisting of an iron chloride and an iron bromide, (ii) an alkali metal acetylide and (iii) a ketone selected from the group consisting of 2,5-hexanedione, 2,4-pentanedione, acetophenone, cyclohexanone, benzophenone and methyl ethyl ketone, said catalyst containing approximately equimolar proportions of iron halide and ketone and containing from 2 to 8 mols of alkali metal acetylide per mol of iron halide, and maintaining the temperature in said reaction zone in the range of 20° to 80° C.

5. A catalyst for homopolymerizing an acetylenic compound of the formula $CH{\equiv}CR$, wherein R is selected from the group consisting of hydrogen, alkyl, cycloalkyl, alkenyl, and aryl, said catalyst being comprised of (i) an iron halide selected from the group consisting of an iron chloride and an iron bromide, (ii) an alkali metal acetylide and (iii) a ketone containing 4 to 13 carbon atoms and being free from aliphatic unsaturation, said catalyst containing approximately equimolar proportions of iron halide and ketone and containing from 2 to 8 mols of alkali metal acetylide per mol of iron halide.

6. A catalyst for homopolymerizing an acetylenic compound of the formula $CH{\equiv}CR$, wherein R is selected from the group consisting of hydrogen, alkyl, cycloalkyl, alkenyl, and aryl, said catalyst being comprised of (i) an iron halide selected from the group consisting of an iron chloride and an iron bromide, (ii) an alkali metal acetylide and (iii) a ketone selected from the group consisting of 2,5-hexanedione, 2,4-pentanedione, acetophenone, cyclohexanone, benzophenone and methyl ethyl ketone, said catalyst containing approximately equimolar proportions of iron halide and ketone and containing from 2 to 8 mols of alkali metal acetylide per mol of iron halide.

References Cited by the Examiner

UNITED STATES PATENTS

| 2,485,454 | 10/49 | Nelson et al. | 260—94.1 |
| 2,827,447 | 3/58 | Nowlin et al. | 260—94.9 |
| 2,871,276 | 1/59 | Eiszner | 260—683.15 |
| 2,882,264 | 4/59 | Barnes et al. | 260—94.9 |
| 3,119,799 | 1/64 | Natta et al. | 260—94.1 |
| 3,131,172 | 4/64 | Carpenter | 260—94.1 |

FOREIGN PATENTS

| 548,927 | 7/56 | Belgium. |
| 530,753 | 7/55 | Italy. |

OTHER REFERENCES

Calloway, Chemical Reviews vol. 17, Aug.–Dec. 1935, pages 327–382, pages relied upon 374–382.

Staudinger, "Hoch-Molekulare Organische Verbindungen" (pages 16, 17, and 19), Edwards Bros. Inc. (1943).

JOSEPH L. SCHOFER, *Primary Examiner.*

MILTON STERMAN, H. N. BURSTEIN, JOSEPH R. LIBERMAN, WILLIAM H. SHORT, *Examiners.*